United States Patent [19]
Cassidy

[11] Patent Number: 5,563,472
[45] Date of Patent: Oct. 8, 1996

[54] INTEGRATED FUSE LIGHTING SYSTEM

[75] Inventor: Robert E. Cassidy, Lebanon, N.H.

[73] Assignee: Luminescent Systems, Inc., East Aurora, N.Y.

[21] Appl. No.: 355,743

[22] Filed: Dec. 14, 1994

[51] Int. Cl.⁶ ................................. H05B 37/02
[52] U.S. Cl. .................... 315/119; 362/800; 315/324
[58] Field of Search .................... 362/800, 806, 362/246, 249, 391; 315/127, 250, 119, 185 S, 324, 74

[56] References Cited

U.S. PATENT DOCUMENTS

| | | | |
|---|---|---|---|
| 3,521,049 | 7/1970 | Young | 362/249 |
| 3,755,663 | 8/1973 | George, Jr. | 240/10 R |
| 4,104,555 | 8/1978 | Fleming | 313/512 |
| 4,143,297 | 3/1979 | Fischer | 313/502 |
| 4,159,559 | 7/1979 | Robinson, Sr. | 445/35 |
| 4,608,308 | 8/1986 | Igarashi et al. | 428/408 |
| 4,654,765 | 3/1987 | Laidman | 362/238 |
| 4,661,373 | 4/1987 | Kato et al. | 427/66 |
| 4,994,944 | 2/1991 | Vernondier | 362/238 |
| 5,051,654 | 9/1991 | Nativi et al. | 313/506 |
| 5,161,882 | 11/1992 | Garrett | 362/249 |

FOREIGN PATENT DOCUMENTS

| | | |
|---|---|---|
| 0323217A1 | 5/1989 | European Pat. Off. |
| WO88/04467 | 6/1988 | WIPO |
| WO92/14092 | 8/1992 | WIPO |

*Primary Examiner*—Robert Pascal
*Assistant Examiner*—Michael Shingleton
*Attorney, Agent, or Firm*—Steven J. Hultquist

[57] ABSTRACT

A lighting unit including an illumination element, and an electric circuit comprising electric power supply leads, coupled with the illumination element and operable to deliver electric power to the illumination element for actuation thereof, having an electric fuse integrally coupled to at least one of the leads to provide electrical isolation of the lighting unit in the event of an electrical short therein. The invention has particular utility in application to electroluminescent lamp units, of a type which is usefully employed in assembly of multi-unit electroluminescent lamp arrays. When provided in a parallel circuit arrangement comprising a multiplicity of individually fused lamps on a common power feed, the failure of any one lamp will not cause any other lamp to cease operation.

24 Claims, 5 Drawing Sheets

Fig. 9 though lighting systems of the aforementioned general type have been widely and successfully commercialized, such systems nonetheless suffer from various associated deficiencies which have limited their utility and applicability, as described more fully below.
INTEGRATED FUSE LIGHTING SYSTEM

BACKGROUND OF THE INVENTION

1. Field of the Invention

This invention relates to lighting systems of a type comprising connectable unitary modular lighting assemblies, as employed to provide illumination in a wide variety of industrial, commercial, and consumer applications.

2. Description of the Related Art

Lighting systems of widely varying types are known in the art and in extensive conventional use. In many applications, lighting systems are employed which comprise modular lighting units including an elongate casing, e.g., in the form of an extruded tubular housing of resilient, translucent or transparent material (e.g. plastic tubing). Within the extruded tubular housing is a sequence of spaced-apart bulbs or other light emitting sources (such as LEDs, incandescent bulbs, or other electroluminescent lamps) in series and/or parallel relationship with one another. Lighting units of such illumination systems thus are provided in a unitary modular form, with the respective lighting units being interconnectable with one another, in series and/or parallel relationship, to form multi-unit extended lighting system assemblies for illumination of a specific environment or locus.

In parallel relationship arrangements of interconnected modular lighting units, means are provided for electrical communication of the illumination elements, usually disposed in serial relationship to one another in the interior of the housing of the strip lighting unit, with an exterior, and often remote, electrical (voltage) source, as well as with other lighting units. Such electrical communication is typically effected by means of alternating current (AC) conduction paths within the lighting unit. The AC conduction paths may be suitably coupled, e.g., co-linearly or coaxially, with an electrical connection line forming a connection between the AC conduction paths within the lighting unit. Multiple modular lighting units thereby may be deployed in parallel relationship to one another, or alternatively, series relationship arrangements of interconnected multiple modular lighting units may be conveniently fabricated and assembled.

One illustrative illumination device of the above general type is an electroluminescent light source, e.g., of a general type as broadly described in U.S. Pat. No. 5,051,654 issued Sep. 24, 1991 to Larry A. Nativi, et al., the disclosure of which hereby is incorporated herein by reference. Such electroluminescent light source may comprise a layer of electroluminescent phosphor material typically of a metal activated zinc sulfide fixed in place by a polymer binder between two conductive layers, one of which is transparent. When an alternating electric field is applied across the conductors, the phosphors are excited and emit photons with almost all of the radiated energy lying within the visible light spectrum. In such lighting units, the emission spectrum and wavelength generated by the phosphors is controlled by the activator element such as copper or manganese.

In the fabrication of such electroluminescent lamps, a conductive non-transparent sheet, e.g., of aluminum foil, is coated with an insulating layer of high dielectric constant material such as barium titanate. Next, an electroluminescent phosphor in a polymer binder is deposited over the dielectric layer and oven dried. A transparent conductive coating such as indium oxide or indium tin oxide, or an indium tin oxide sputtered Mylar film, then is deposited over the phosphor layer to form the front electrode of the lamp. A busbar having a conductivity greater than the conductivity of the transparent conductive coating is formed adjacent the periphery of the transparent conductive coating, and a thin nylon preformed film is applied over the busbar and the front electrode. The nylon film next is pulled up to position and attach the front lead and a second lead is attached to the aluminum foil conductive substrate. The entire assembly excluding a portion of the connecting leads then is sandwiched between two moisture barrier films such as polychlorotrifluoroethylene or polyester film, which are heat-laminated to the assembly and to each other around the periphery of the lamp.

Regardless of the specific form or type of illumination unit in a multi-unit lighting assembly, the resulting array of modular lighting unit(s) is disposed at a selected position in the specific environment or locus of use. For example, a length of the lighting assembly formed by an end-to-end series-connected plurality of lighting units, may be provided in a non-slip nosing structure extending across the front edges of the steps of a staircase, or mounted along a handrail or at the intersection of a wall and the floor in a hallway, thereby defining a directional path or boundary demarcation means. Another example is the provision of an illuminated path provided along the aisle and exits of an aircraft in the event of an emergency.

A wide variety of decorative and safety-enhancement uses for such lighting systems exists. Further, when the housings of the individual component lighting units in the assembly are of a deformable and flexible character, holding their shape and conformation as deformed, the resulting lighting assembly may advantageously be utilized in non-linear deployment applications, in which the "line" of the originally interconnected lighting modular units may be bent or deformed to a desired curvature or other non-linear conformation at the locus of use.

Individual light source (illumination) elements in lighting systems are generally highly sensitive to variations of input voltage to the lighting modular unit containing such light source elements. In arrangements of lighting units in multi-unit system arrays, the failure of individual light source elements (generating short circuits) cause unsatisfactory fluctuations in voltage across the remaining light sources, often of a sufficient magnitude to render the unit at least partially inoperative.

Open circuit failures in a lighting module in a multi-module lighting system will break the circuit completely, and result in illumination failure.

Short circuits in a parallel arrangement of lighting modules will affect the voltage across all light sources in the system. The resulting voltage fluctuations and voltage level changes are often observable in the level (intensity) and consistency of the illumination provided by the lighting system, and may in the extreme diminish or even destroy the illumination capacity of sections or the whole of the lighting system.

The voltage sources and related voltage regulator circuitry incorporated into prior art designs of both the parallel and the series type have included only gross means for protecting the modular lighting units and resulting multi-unit lighting systems against short circuit failure of the light emitting elements therein. The conventional prior art practice has been to incorporate fuses into the power distribution system associated with the modular strip lighting units and resulting multi-unit lighting systems, thereby rendering entire series of light source elements susceptible to cessation of operation due to individual voltage (power) source failures.

A known alternative to such fused design utilizes a completely parallel circuitry in which each light source element is individually connected to the common voltage source power supply means, and each individual light source element/power supply means connection has its own separate fuse. Such a solution, however, is impractical for the reason that its implementation undesirably increases the cost, complexity, and size of the lighting system.

In addition to installational/operational difficulties, previous modular lighting systems have entailed mechanical design deficiencies which have adversely affected their implementation and use. In particular, although electroluminescent lamps have been in extensive use for a long period of time, the present practice to protect the power distribution system providing power to the electroluminescent lamp array has been to incorporate a fuse into the distribution system to prevent the occurrence of electrical overload conditions especially during short circuit failures of individual electroluminescent lamp elements in the lighting array. Another method of protecting the electroluminescent lighting system from overload incident to lamp failure which has been utilized in the prior art is the powering of each lamp off an individual power circuit which is protected by a fuse. While these approaches do work, they increase the complexity of the lighting system and restrict product applications in instances where individual fusing needs to be simple and inexpensive.

Accordingly, it would be a significant advance in the art, and is correspondingly an object of the present invention, to provide a lighting system, and modular lighting units therefor, which overcome the aforementioned deficiencies of the prior art, and provides a simple, ready and economical lighting unit protected against electrical overload conditions, e.g., overload conditions caused by failure of individual lamp elements in a multi-element lighting unit.

Various objects, advantages and improvements of the present invention will be more fully apparent from the ensuing disclosure and appended claims.

SUMMARY OF THE INVENTION

The present invention relates to a lighting unit which comprises an integrated fuse to provide electrical isolation of the lighting unit in the event of an electrical short in the lighting unit.

The invention is particularly usefully employed in lighting systems of the type in which a multiplicity of lighting units are employed to form a multi-unit lighting assembly. An example of such a lighting assembly is a parallel arrangement of electroluminescent lamps in which the lamps are provided in a laminated structural having a ribbon-like conformation. Examples of electroluminescent lamps of such type include the lamps shown and described in U.S. Pat. No. 5,051,654 issued Sep. 24, 1991 to L. A. Nativi, et al.

As used herein, the term "integral" or "integrally" used in reference to the fuse element of the lighting unit and lighting assembly of the present invention, means that the fuse is electrically and mechanically coupled in the lighting unit itself to a lead wire which in turn is electrically and mechanically coupled to a lighting element (electroluminescent material, light emitting diode, field emitter anode comprising phosphorluminescent material, etc.) of such unit.

The fuse may comprise any suitable fuse element of a suitable size, structure and electrical rating to disrupt the electrical circuit in which the fuse is deployed, upon occurrence of electrical power flow in excess of the capacity of the fuse. As used herein, the term "fuse" has its ordinary and conventional meaning of an electrical safety device comprising a wire, strip, or or other form of fusible material, e.g, metal, that melts and interrupts a circuit when the current exceeds a predetermined amperage. In the case of electroluminescent lamps, the fuse may advantageously comprise a commercially available pico-fuse, a fusible link, etc.

As used herein, the term "auto-splice connector" refers to a connector which is mechanically deformable, e.g., manually or by use of a tool, to provide a mechanical connection of lead(s) with other structure in a lighting unit. The lead(s) may comprise lead(s) of a fuse, and/or lead(s) of the lighting element(s) in the lighting unit. A particularly preferred type of auto-splice connector is mechanically deformable by compression, as a crimpable connection structure. A lighting unit as referred to herein means an operative combination of elements for producing light when coupled with power supply means. The lighting unit thus includes the lighting element and associated circuitry as a unitary structure, such as for example a discrete ribbon or strip of illumination-producing structure having leads connectable to a power supply or to matable leads of a second lighting unit of the same type, in the case of an electroluminescent lamp.

Other aspects, features and embodiments of the invention will be more fully apparent from the ensuing disclosure and appended claims.

DETAILED DESCRIPTION OF THE INVENTION, AND PREFERRED EMBODIMENTS THEREOF

While the present invention will be described more fully hereinafter with reference to the accompanying drawings, in which particular and illustrative embodiments are shown, it is to be understood at the outset that persons skilled in the art may modify the invention herein described while achieving the functions and results of this invention. Accordingly, the description which follows is to be understood as merely illustrative and exemplary of specific structures, aspects and features within the broad scope of the present invention and not as limiting of the broad scope of the invention.

Figure 1:
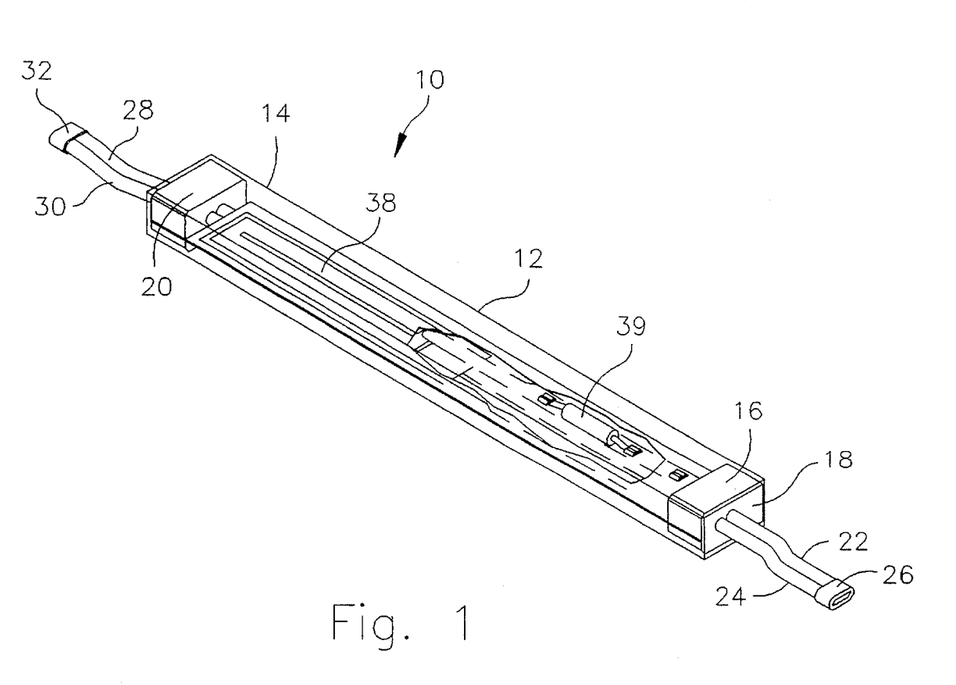
FIG. 1 is a perspective view of a modular lighting unit according to one embodiment of the present invention.

FIG. 1 is a perspective view of a modular lighting unit 10 according to one embodiment of the present invention. The modular lighting unit 10 is an electroluminescent lamp lighting unit, and comprises main body portion 12, of laminated structure which may for example comprise the electroluminescent lamp construction described in U.S. Pat. No. 5,051,654 to Nativi, et al., the disclosure of which is hereby incorporated herein by reference.

The main body portion 12 of the modular lighting unit 10 thus comprises electroluminescent lamp 38. As mentioned hereinabove, the lighting units and multi-unit systems of the present invention may be utilized with any suitable lamp or light source means. As used herein, the term "light" is intended to be broadly construed, and while preferably comprising visible electromagnetic radiation, may alternatively comprise ultraviolet, near-ultraviolet, infrared, or other electromagnetic radiation. By way of example, the strip lighting unit may comprise an ultraviolet (uv) lamp element as the "light" source means, as useful for the curing of uv-curable resins, films and coatings.

To accommodate the electroluminescent lamp 38 disposed in the main body portion 12 of the lighting unit 10, the main body portion suitably comprises at least a part thereof which is light-transmissive in character. The main body portion of the lighting unit may be of any suitable shape and size, commensurate with the desired end use application of such unit, however the elongate form shown in FIG. 1 is desired in many applications, particularly when such lighting unit is employed in a multi-unit array comprising plural lighting units of such type, as strip lighting assemblies for illumination of a specific locus or environment. The main body portion may have a generally rectangular cross section as shown, for ease of fabrication and installation, being of substantially flat ribbon or strip form.

The main body portion of the lighting unit may in the embodiment shown in FIG. 1 constitute a housing defining an interior volume containing the circuitry 39 and illumination element 38 of the lighting unit. The main body portion has respective end segments 14 and 16, which may for example be closed by closure plug elements 20 and 18, respectively, having feedthrough openings therein accommodating passage therethrough of lead wires 18 and 22 at end segment 16, and passage of lead wires 28 and 30 through the closure plug 20 at end segment 14.

Lead wires 22 and 24 are joined at their outer extremities to connector 26. In like manner, wires 28 and 30 are joined at their outer extremities to connector 32. These connectors provide means for connection of the lighting unit to either another similarly constructed lighting unit, or else to other power supply means, such as a battery, power cord, or electrical generator. Alternatively, the connectors of plural lighting units of the type shown in FIG. 1 may be coupled to a header or wiring harness in parallel relationship to one another.

Figure 2:
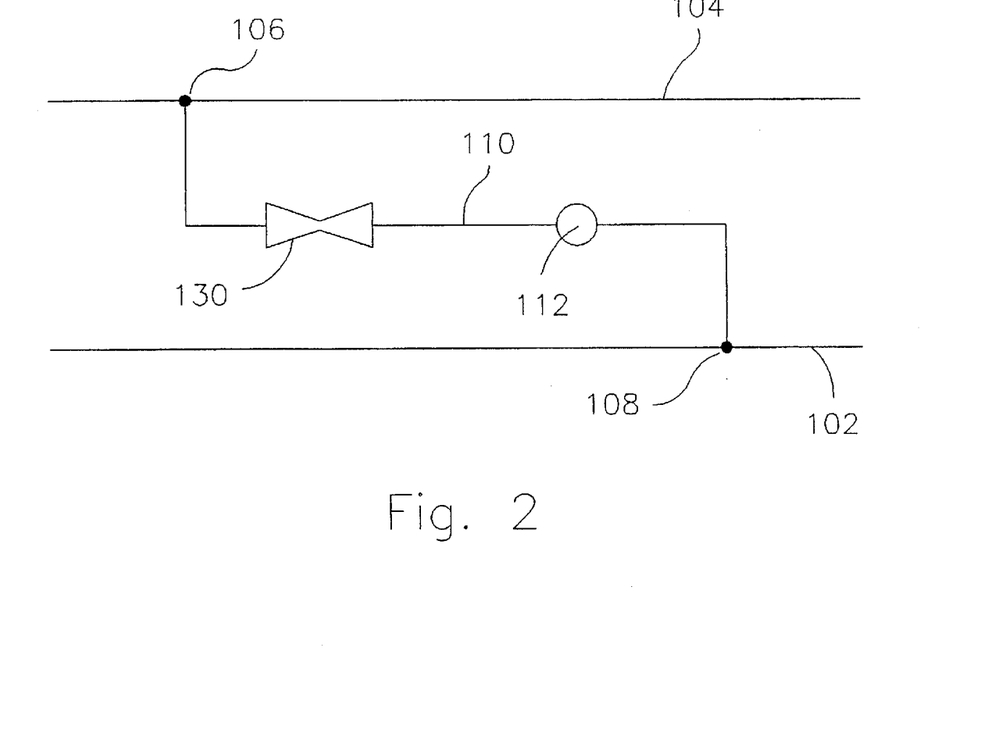
FIG. 2 is a schematic circuit diagram of a fused strip lighting assembly, comprising a light source element and a pico-amp fuse.

FIG. 2 is a schematic circuit diagram of a circuit according to one aspect of the present invention, comprising a pico-fused light source element conduction line. The primary conduction path lines, comprising positive and negative lines 104 and 102, are connected to a pico-fused conduction line 110 at junctions 106 and 108, respectively. Conduction line 110 comprises a single light source element 112 in series with a pico-fuse 130. In the event of a short circuit failure of light source element 112, the resultant increase in current along conduction line 110 triggers the pico-fuse 130 to open, creating an open circuit, and thereby protecting any other elements in the circuit and/or the voltage source from short circuit current overload.

Figure 3:
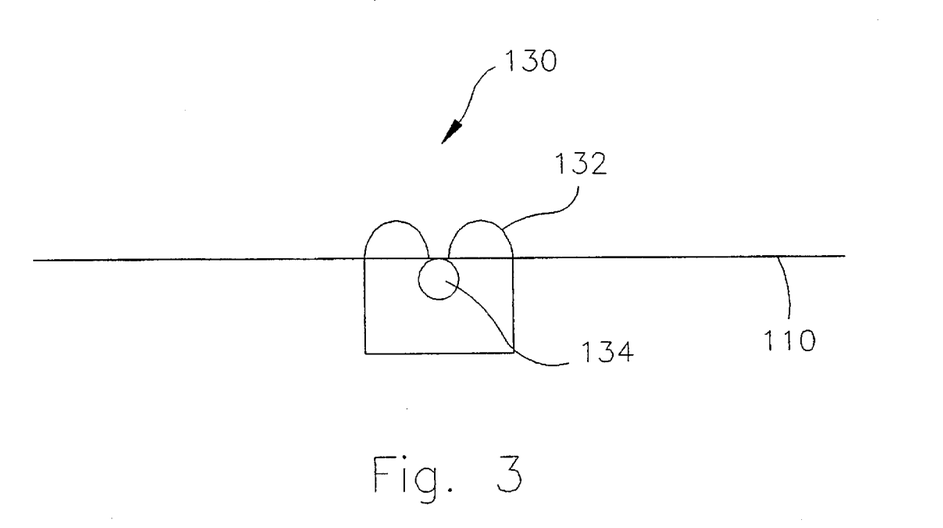
FIG. 3 is a schematic sectional end view of the pico-amp fuse in mechanically crimped electrical conducting communication with an electrical conduction path.

FIG. 3 is a schematic representation of the pico-fuse protected light source conduction line 110 shown in FIG. 2. A pico-fuse, shown generally at 130, is connected by mechanical attaching means (auto-splice crimping structure) to conduction line 110. Crimping arms 132 mechanically attach to the conduction line 110, thereby securing the pico-fuse element 134 to conduction line 110.

Figure 4:
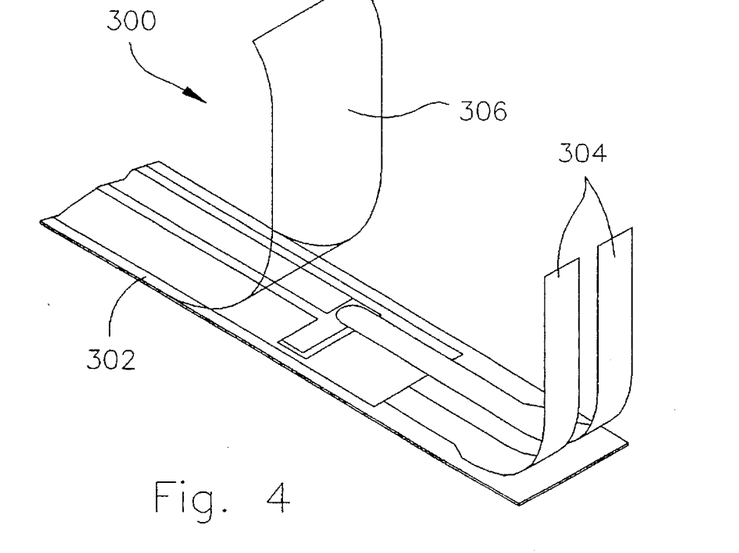
FIG. 4 is a perspective view of a portion of a ribbon-type electroluminescent lamp unit according to another embodiment of the invention.

FIG. 4 is a perspective assembly view of a portion of a ribbon-type electroluminescent lighting assembly 300 comprising a main body portion 302 including metal foil leads 304 which are coupled in power supply relationship with alternating current (AC) voltage supply source means, to deliver electrical power to the electroluminescent lighting unit comprising illumination elements such as those of the type illustratively described hereinabove. The main body portion 302 of the electroluminescent lighting unit is of a laminated character, including transparent film layer 306 overlying the main body portion 302 and transmitting light therethrough when the electroluminescent lighting unit is operatively actuated.

Figure 5:
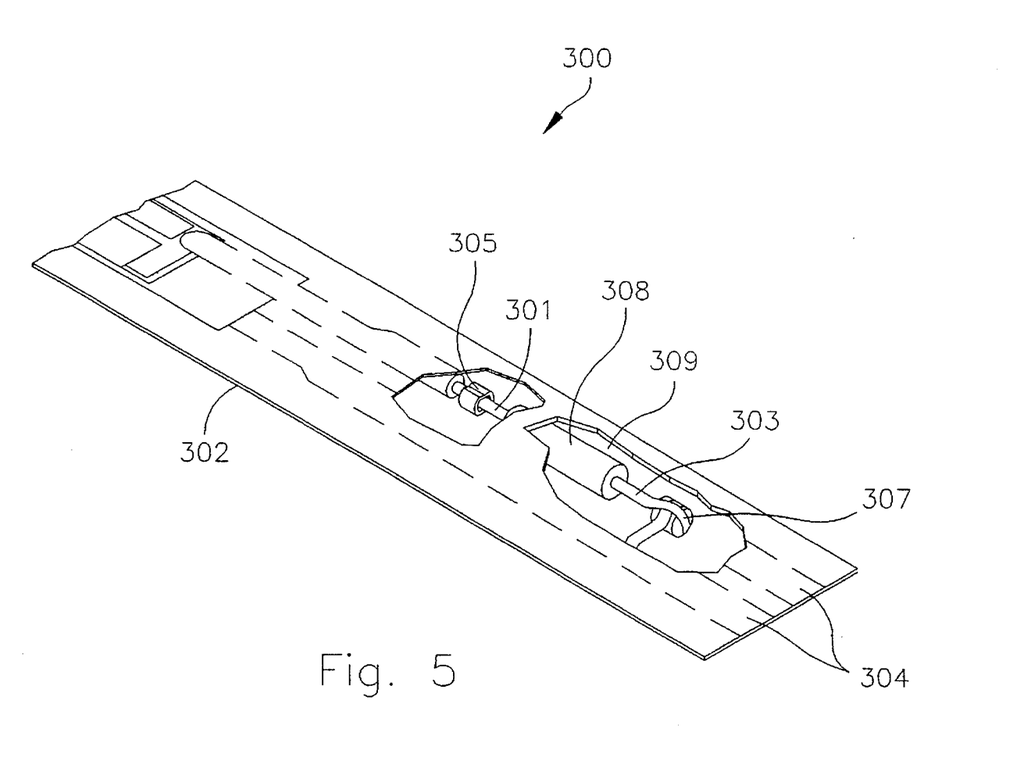
FIG. 5 is a top perspective view of a portion of a fused electroluminescent lighting unit of the type shown in FIG. 4.
Figure 6:
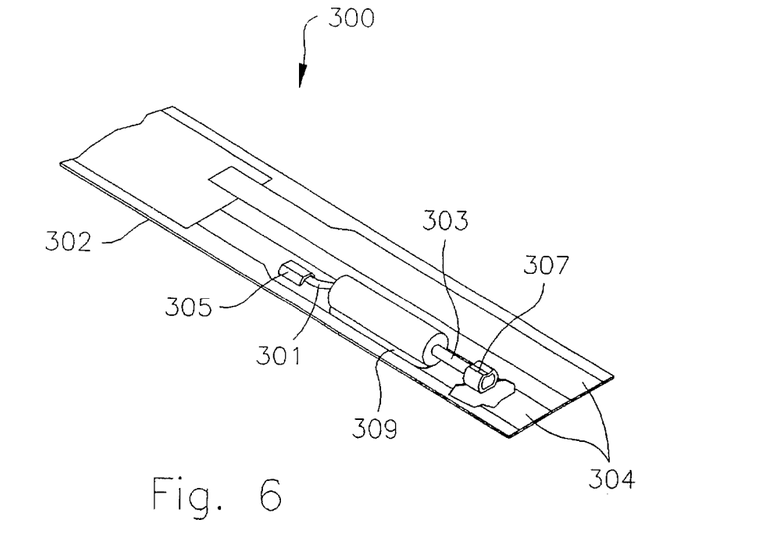
FIG. 6 is a bottom perspective view of the portion of the fused electroluminescent lighting unit of FIG. 5, showing the details of the fuse coupling to the unit.

FIG. 5 is a top perspective view of the composite ribbon-type electroluminescent lighting assembly 300 of the type shown in FIG. 4, as assembled for operation, and FIG. 6 is a corresponding bottom perspective view of the electroluminescent lighting assembly showing the electrical coupling to one of the leads 304 of a fuse element 308, e.g., a pico-fuse element, as hereinearlier described. The fuse element 308 may as shown be disposed in a cut-out 309 in the main body portion of the lighting unit, with fuse leads 301 and 303 being mechanically joined in electrical contact with the lead 304 by means of the crimpable autosplice members 305 and 307, respectively.

Figure 7:
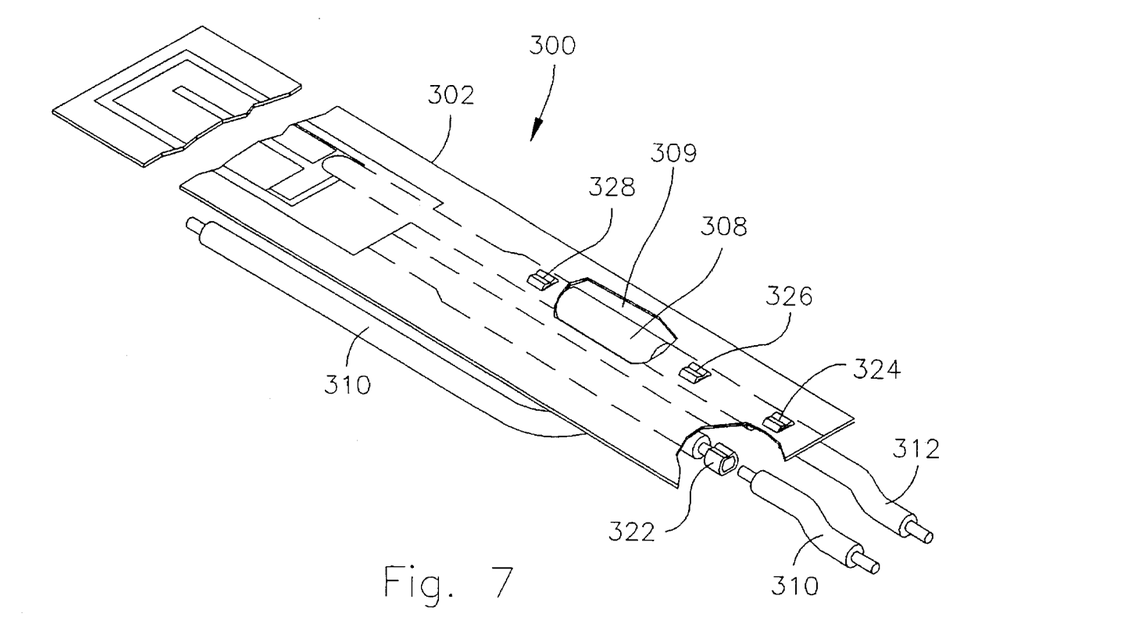
FIG. 7 is a top perspective view of a fused electroluminescent lighting unit of a general type as shown in FIG. 6.

FIG. 7 is a top perspective view of a ribbon-type electroluminescent lighting assembly 300 of the general type shown in FIGS. 4–6, illustrating the connection with the metal foil leads 330 and 332 of a pair of electrical lead wires 310 and 312, for delivery of electrical power to the metal foil leads for operation of the electroluminescent lighting unit. The autosplice connectors 322, 324, 326 and 328 are shown, together with the fuse 8 mounted in cutout 9.

Figure 8:
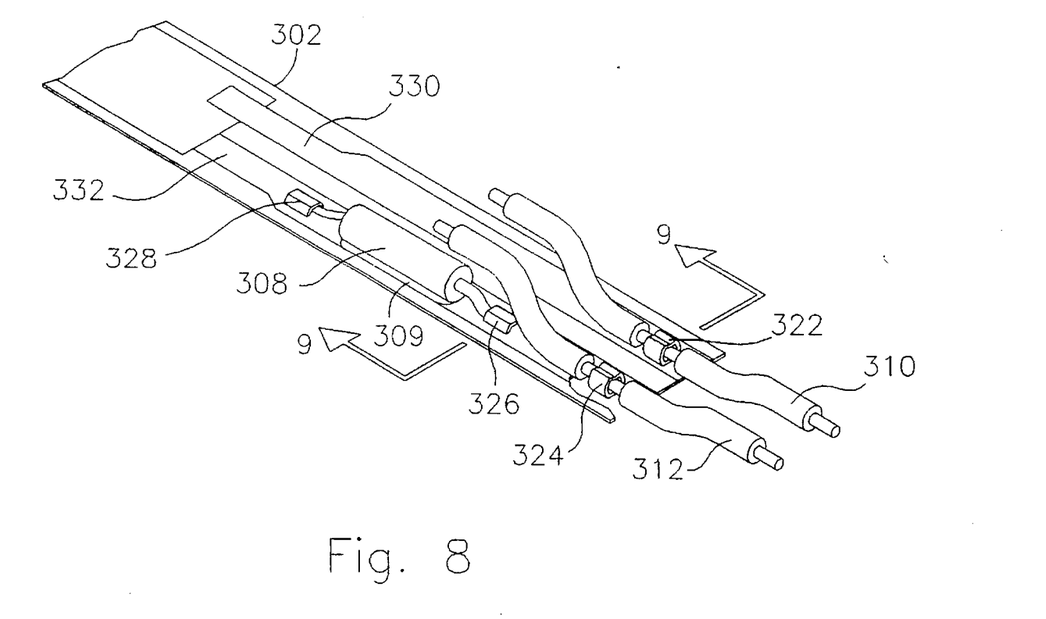
FIG. 8 is a bottom perspective view of the portion of the fused electroluminescent lighting unit of FIG. 7, showing the details of the fuse coupling to the unit, as well as the connection of the power distribution leads to the lighting unit.

FIG. 8 is a bottom perspective view of the electroluminescent lighting assembly 300 of FIG. 7, showing the autosplice lead connectors 322 and 324 joining the power distribution leads 310 and 312 to the metal foil leads 330 and 332, to provide a connection for parallel arrangement of the strip lighting unit 300 with other strip lighting units of corresponding type (such other strip lighting units not being shown for clarity in FIG. 8) in a multi-unit assembly wherein the respective strip units are in parallel electrical relationship to one another. FIG. 8 also shows the autosplice connectors 326 and 328 joining the fuse 308 in electrical contact with foil lead 332, such connectors also mechanically coupling the fuse to the main body portion 302 of the lighting unit.

Figure 9:
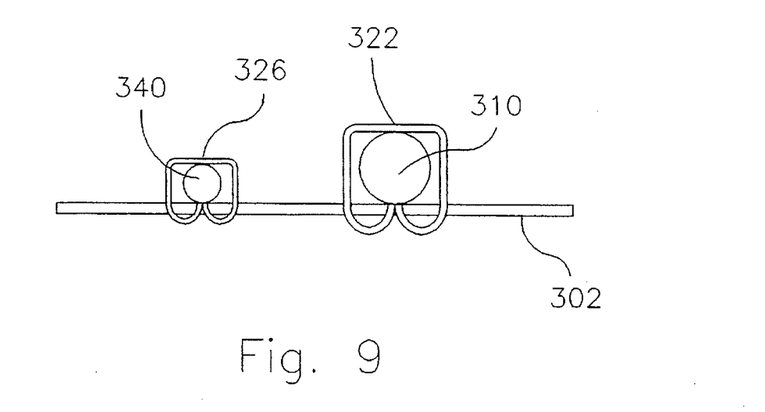
FIG. 9 is a sectional edge elevation view, taken along lines 9—9 of FIG. 8, showing the details of the autosplice components of the fuse and one of the leads of the lighting unit illustrated in FIG. 8.

FIG. 9 is a sectional edge elevation view, taken along lines 9—9 of FIG. 8, showing the details of the lighting unit 300 illustrated in FIG. 8. As shown, the compressive connector 326 crimpingly circumscribes the fuse lead 340 and connects it to the main body portion 302 of the lighting unit, while compressive connector 322 crimpingly circumscribes power distribution lead 310 and couples it to the main body portion 302 of the lighting unit.

The integral fusing arrangement of lighting units of the present invention represents a substantial advance in the art of modular lighting systems (e.g., electroluminescent lighting systems) which comprise a multiplicity of lamp elements and which are employed in parallel circuits requiring current limiting or electrical protection to protect the lighting installation or other components within the power distribution system from electrical overload during short circuit failure of individual lamp elements. Although electroluminescent lamps and other light source devices have been in wide use in the prior art, the art has not contemplated an integrated fuse for power system protection in the event that a single lamp element fails by short circuiting.

The present invention allows an individual lamp to be individually fused. When operated in parallel circuits of one or more lamps per branch or module, operating on a single power feed, the failure of any one lamp will not cause any other lamp to cease operation.

In application to electroluminescent lighting units of strip- or ribbon-type conformation, the electroluminescent lamp lead wire area is provided of a sufficient character so that an inexpensive and commercially available fuse, e.g., a pico-fuse, can be attached to the surface of the lamp package material. Electrical connection to the internal lead wire is accomplished by mechanical means, such as by an autosplice crimp. To electrically incorporate the fuse in the lamp structure, in the case of an electroluminescent lamp, the lead in the electroluminescent lamp may be punched out and the fuse mounted in position in the punch-out cavity, so that the fuse lead can be crimpingly or otherwise coupled to the electrical lead of the lamp.

In an alternative variation to the crimped fuse structure illustratively described hereinabove, the crimped auto-splice connector could be replaced by a socket assembly which would allow for replacement of the fuse subsequent to "blowing" of the fuse in response to occurrence of a short circuit. As another alternative, the fuse described hereinabove could be replaced with an integrated fusible link which could be attached to the lighting unit by any suitable mechanical arrangement ensuring electrical connection of the lighting circuit to the fusible link. As a still further embodiment and variation of the invention, the illustrated distribution system wires could be replaced with pin or socket connectors which would allow lamp to be coupled to the electrical power distribution system via a removable/replaceable means.

Although the invention has been illustratively described herein with reference to various exemplary embodiments, aspects, and features, it will be recognized that the invention is not thus limited, and that the invention contemplates other variations, modifications, and embodiments, and accordingly that the invention is to be broadly construed to encompass all such additional variations, modifications, and other embodiments, within the spirit and scope of the invention as claimed.

What is claimed is:

1. A lighting unit, comprising:
   a pair of power supply leads, a first one of said leads being a positive voltage lead, and a second one of said leads being a negative voltage lead;
   a plurality of illumination-generating elements; second one of said leads being a negative voltage lead;
   a corresponding plurality of conduction lines, each of said conduction lines coupling one of said illumination-generating elements across said pair of power supply leads such that electrical energy may be furnished to said one illumination-generating element when said pair of supply leads are joined in electrical power supplying relationship with a power supply means, and such that each of said plurality of illumination-generating elements is in parallel with one another; and
   a corresponding plurality of integrated fuses, each of said integrated fuses being coupled to a corresponding one of said conduction lines, in series relationship with said one illumination-generating element, such that each of said illumination-generating elements is thereby electrically isolated from other illumination-generating elements in the event of an electrical short.

2. A lighting unit according to claim 1, comprising an electroluminescent lamp.

3. A lighting unit according to claim 2, wherein the illumination-generating element and lighting unit circuitry are contained in a unitary body portion of the unit.

4. A lighting unit according to claim 3, comprising an electroluminescent lamp.

5. A lighting unit according to claim 3, wherein the fuse is mechanically coupled to the unitary body portion of the unit.

6. A lighting unit according to claim 3, wherein the fuse is mechanically coupled to the unitary body portion of the unit by an auto-splice connector.

7. A lighting unit according to claim 1, wherein the fuse element is selected from the group consisting of pico fuses, and fusible link structures.

8. A lighting unit for use in a lighting system including at least one said unit, wherein said lighting unit comprises an elongate lighting unit body including therein (i) a plurality of illumination-generating elements; (ii) a pair of power supply leads, a first one of said leads being a positive voltage lead, and a second one of said leads being a negative voltage lead; (iii) a corresponding plurality of conduction lines, each of said conduction lines coupling one of said illumination-generating elements across said pair of power supply leads such that electrical energy may be furnished to said one illumination-generating element when said pair of supply leads are joined in electrical power supplying relationship with a power supply means, and such that each of said plurality of illumination-generating elements is in parallel with one another; and (iv) a corresponding plurality of integrated fuses, each of said integrated fuses being coupled to a corresponding one of said conduction lines, in series relationship with said one illumination-generating element, such that each of said illumination-generating elements is thereby electrically isolated from other illumination-generating elements in the event of an electrical short.

9. A lighting unit according to claim 8, wherein the electric fuse comprises a pico-fuse.

10. A lighting unit according to claim 9, wherein the pico-fuse is mechanically connected with said one of said electric power supply leads.

11. A lighting unit according to claim 10, wherein the mechanical connection is effected by an auto-splice crimping device securing the pico fuse to said one of said electric power supply leads.

12. A lighting assembly comprising a multiplicity of lighting units arranged in an interconnected array, and wherein each lighting unit comprises:
   a plurality of illumination-generating elements;
   a pair of power supply leads, a first one of said leads being designated a positive voltage lead, and a second one of said leads being designated a negative voltage lead;

a corresponding plurality of conduction lines, each of said conduction lines coupling one of said illumination-generating elements across said pair of power supply leads such that electrical energy may be furnished to said one illumination-generating element when said pair of supply leads are joined in electrical power supplying relationship with a power supply means, and such that each of said plurality of illumination-generating elements is in parallel with one another; and a corresponding plurality of integrated fuses, each of said integrated fuses being coupled to a corresponding one of said conduction lines, in series relationship with said one illumination-generating element, such that each of said illumination-generating elements is thereby electrically isolated from other illumination-generating elements in the event of an electrical short.

13. A lighting assembly according to claim 12, comprising an electroluminescent lamp.

14. A lighting assembly according to claim 12, wherein the illumination-generating element and lighting unit circuitry are contained in a unitary body portion of the unit.

15. A lighting assembly according to claim 14, comprising an electroluminescent lamp.

16. A lighting assembly according to claim 14, wherein the fuse is mechanically coupled to the unitary body portion of the unit.

17. A lighting assembly according to claim 14, wherein the fuse is mechanically coupled to the unitary body portion of the unit by an auto-splice connector.

18. A lighting assembly according to claim 12, wherein the fuse element is selected from the group consisting of pico fuses, and fusible link structures.

19. A lighting assembly according to claim 12, wherein the lighting units are arranged in parallel relationship to one another in said array.

20. A lighting assembly comprising a multiplicity of lighting units arranged in an interconnected array, and wherein each lighting unit comprises an elongate lighting unit body including therein: (i) a plurality of illumination-generating elements; (ii) a pair of power supply leads, a first one of said leads being designated a positive voltage lead, and a second one of said leads being designated a negative voltage lead; (iii) a corresponding plurality of conduction lines, each of said conduction lines coupling one of said illumination-generating elements across said pair of power supply leads such that electrical energy may be furnished to said one illumination-generating element when said pair of supply leads are joined in electrical power supplying relationship with a power supply means, and such that each of said plurality of illumination-generating elements is in parallel with one another; and (iv) a corresponding plurality of integrated fuses, each of said integrated fuses being coupled to a corresponding one of said conduction lines, in series relationship with said one illumination-generating element, such that each of said illumination-generating elements is thereby electrically isolated from other illumination-generating elements in the event of an electrical short.

21. A lighting assembly according to claim 20, wherein the electric fuse comprises a pico-fuse.

22. A lighting assembly according to claim 21, wherein the pico-fuse is mechanically connected with said one of said electric power supply leads.

23. A lighting assembly according to claim 22, wherein the mechanical connection is effected by an auto-splice crimping device securing the pico fuse to said one of said electric power supply leads.

24. A lighting assembly according to claim 20, wherein the lighting units are arranged in parallel relationship to one another in said array.

\* \* \* \* \*

UNITED STATES PATENT AND TRADEMARK OFFICE
CERTIFICATE OF CORRECTION

PATENT NO. : 5,563,472
DATED : October 8, 1996
INVENTOR(S) : Robert E. Cassidy

It is certified that error appears in the above-indentified patent and that said Letters Patent is hereby corrected as shown below:

Column 7, Line 63 "a pair of power supply leads, a first one of said leads being a positive voltage lead, and a second one of said leads being a negative voltage lead;" should be --a plurality of illumination-generating elements;--

Column 7, Line 66 "a plurality of illumination-generating elements;" should be --a pair of power supply leads, a first one of said leads being a positive voltage lead, and a second one of said leads being a negative voltage lead;--

Column 7, Line 66 "second one of said leads being a negative voltage lead;" should be deleted Column 8, Line 18 "claim 2" should be --claim 1--

Signed and Sealed this

Eighteenth Day of March, 1997

Attest:

BRUCE LEHMAN

Attesting Officer

Commissioner of Patents and Trademarks